UNITED STATES PATENT OFFICE.

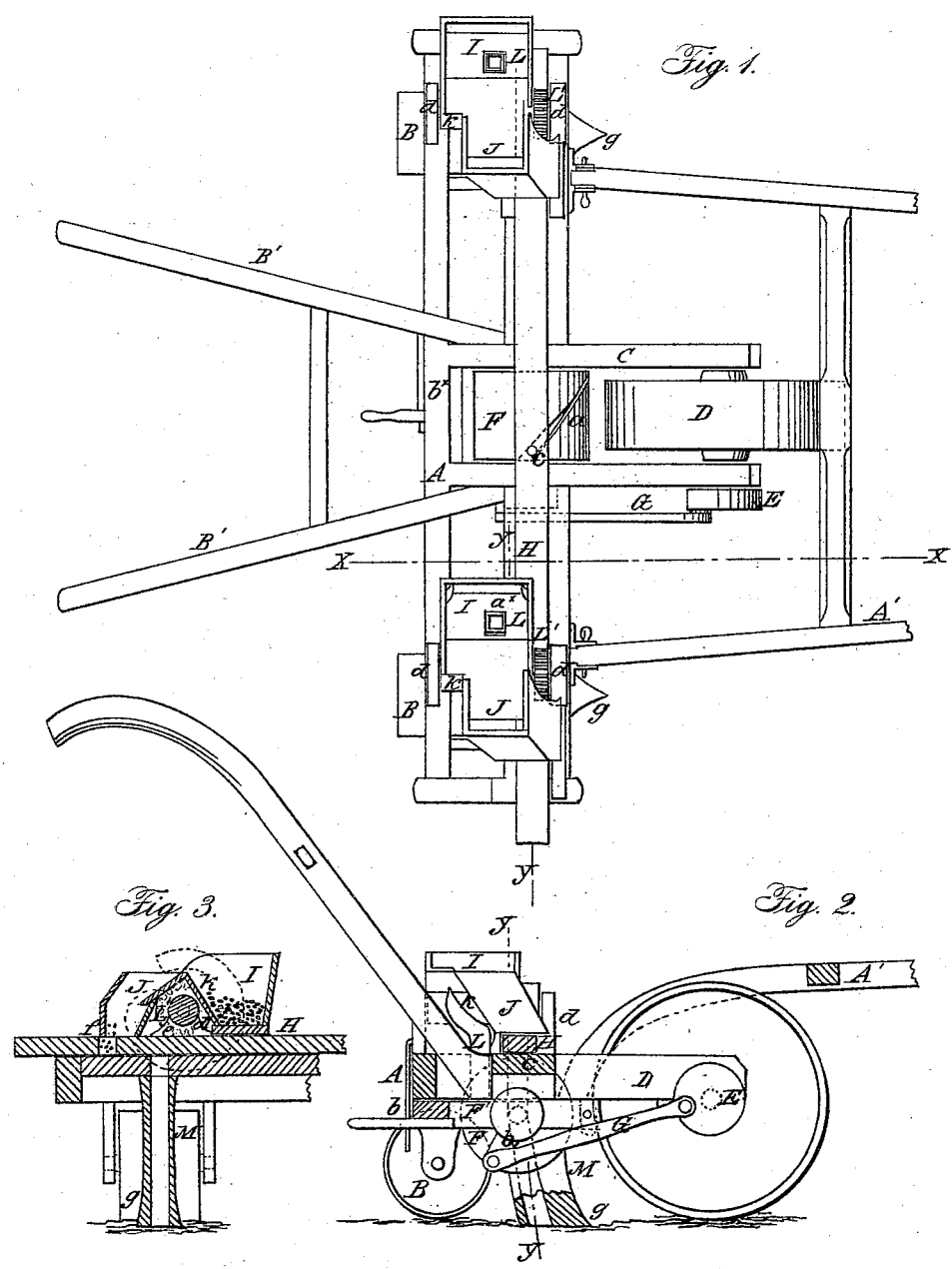

T. B. ROCKWELL AND R. N. ROCKWELL, OF BATAVIA, ILLINOIS.

IMPROVEMENT IN SEED-PLANTERS.

Specification forming part of Letters Patent No. 33,053, dated August 13, 1861.

*To all whom it may concern:*

Be it known that we, T. B. ROCKWELL and R. N. ROCKWELL, of Batavia, in the county of Kane and State of Illinois, have invented a new and Improved Seed-Planting Machine; and we do hereby declare that the following is a full, clear, and exact description of the same, reference being had to the annexed drawings, making a part of this specification, in which—

Figure 1 is a plan or top view of our invention; Fig. 2, a side sectional view of the same, taken in the line $x\,x$, Fig. 1; and Fig. 3, a detached section of a portion of the same, taken in the line $y\,y$, Fig. 1.

Similar letters of reference indicate corresponding parts in the several figures.

This invention relates to an improved seeding-machine of that class designed for planting seed in hills—such, for instance, as the planting of corn.

The invention consists in an improved means for distributing the seed or depositing the same in the furrow, substantially as hereinafter fully shown and described, whereby the seed is distributed evenly or uniformly in hills, and by an arrangement of parts not liable to get out of repair nor become deranged by use.

To enable those skilled in the art to fully understand and construct our invention, we will proceed to describe it.

A represents a rectangular frame, which is supported by two rollers, B B—one near each end—and C is a frame, which projects from the center of the front of the frame A at right angles, and has a wheel, D, fitted in it, the wheel D being the driving-wheel, and having a crank-pulley, E, at one end of its shaft. Within the frame A, at its center, there is placed a cylinder or drum, F, having a spiral groove, $a$, made in it. The drum F has a crank, $b$, at one end of it, which is connected by a rod, G, with the crank-pulley E. The drum F is placed in a hinged frame, F', the back end of which is secured by a catch, $b^x$, so that said frame may be retained in a perfectly horizontal position.

In the spiral groove $a$ of the drum F there is fitted a pin, $c$, said pin being attached to a slide, H, which is placed on the frame A, and is allowed to move freely back and forth thereon.

On each end of frame A there are placed two hoppers, I J. These hoppers adjoin each other at each end of the frame, as shown clearly in Fig. 1, and between each pair of hoppers there is placed a shaft, K, the bearings of which are in uprights $d$ on the frame A. The shafts K have each a curved bar, L, attached, said bars being of semicircular form, and passing through the bottoms of the hoppers I I, the bars L being allowed to work freely through the bottoms of the hoppers I, and project, when fully elevated, over or within the hoppers J, as shown in red outline in Fig. 3. The ends of the bars L are hollowed out to form cups $a^x$. (See Fig. 1.) The shafts K have each a pinion, L', on them, and these pinions gear into racks $e\,e$ on the slide H. The slide H works underneath the hoppers I I, and said slide has a hole, $f$, made in it near each end. To the under side of the frame A, near each end, there is attached a pendent tooth-bar, M. These tooth-bars are hollow, and their lower ends are expanded to form teeth $g$, to make the furrows which receive the seed. The rollers B B are directly behind the tooth-bars M M, and the holes $f\,f$ of the slide H pass over in line or register with the tooth-bars M when the holes pass out from underneath the hoppers I, and as the slide H moves in an opposite direction, the curved bars L are forced up by the racks $e$ and pinions L' through the hoppers I, and the cups $a^x$ in the ends of said bars deposit a "dropping" of seed in the hoppers J, and these droppings are conveyed by the holes or seed-cells $f$ of the slide H to the bars M, through which the seed drops to the furrows. By this arrangement a uniform dropping of the seed is insured, as the holes or seed-cells $f$ of the slide H cannot convey at each time any more seed to the bars M than can be deposited in the hoppers I at each elevation of the bars L. Thus it will be seen that a uniform dropping of the seed is effected. The rollers B B perform their usual function of covering the seed.

The drum F may be thrown out of gear with or detached from the pin $c$ of the slide H at any time, in order to render the slide H inoperative, by lowering the frame F'. The drum F has a reciprocating partially-rotating movement given it from wheel D by the rod G, crank-pulley E, and crank $b$, the spiral groove $a$ of the drum and pin $c$ operating the slide H. The machine is provided with ordinary thills, A', and handles B'.

Having thus described our invention, what we claim as new, and desire to secure by Letters Patent, is—

1. The semicircular or curved bars L L, attached to the shafts K K and operated from the reciprocating slide H, in connection with the hoppers I J, all arranged for joint operation substantially as and for the purpose set forth.

2. Placing the reciprocating partially-rotating drum F, provided with the spiral groove a for operating the slide H, in an adjustable-frame, F', for the purpose of rendering the slide H operative or inoperative, as may be desired.

T. B. ROCKWELL.
R. N. ROCKWELL.

Witnesses:
FRANK CRANDON,
JAMES BROWN.